INVENTOR.
VINCENT A. CARTER
BY
ATTORNEYS

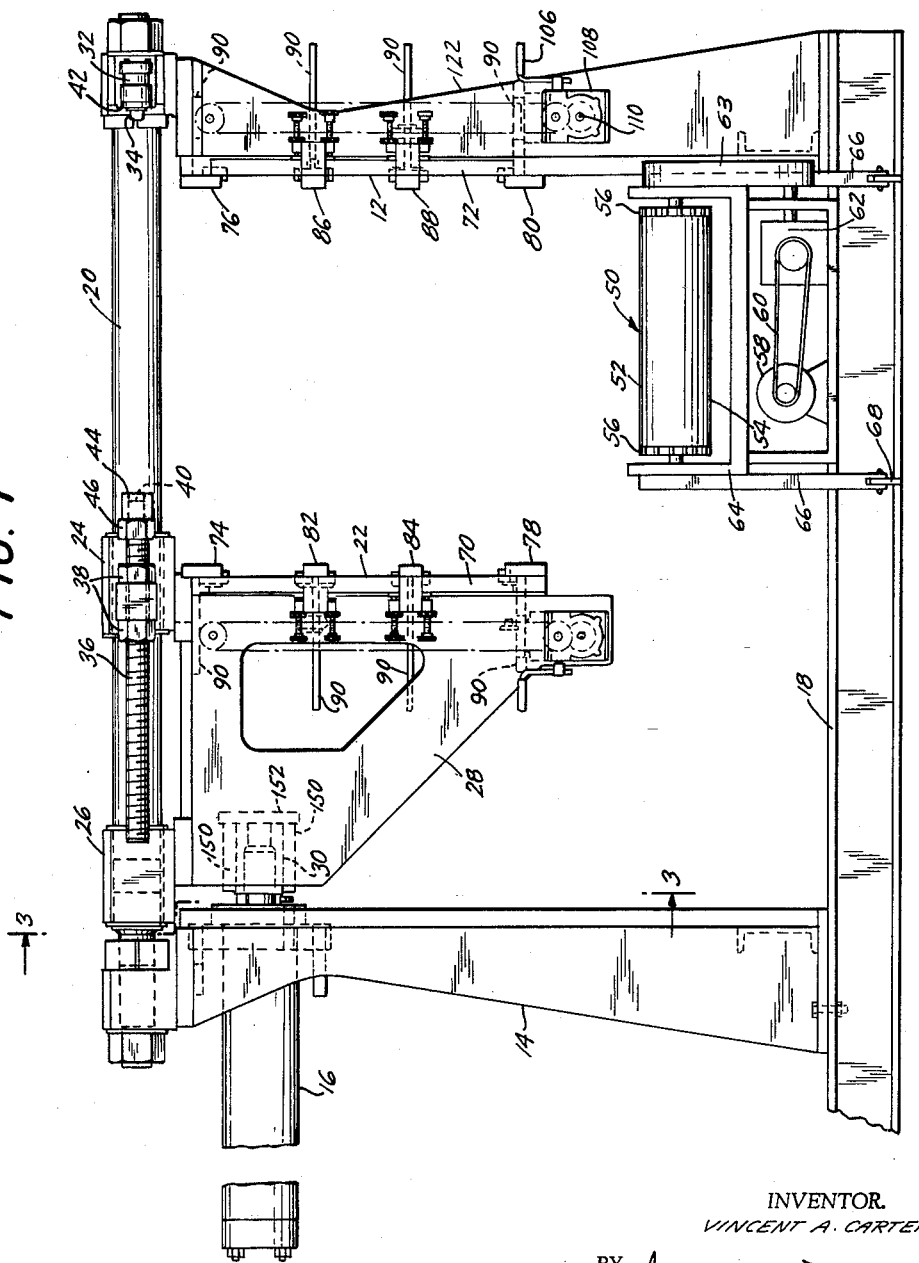

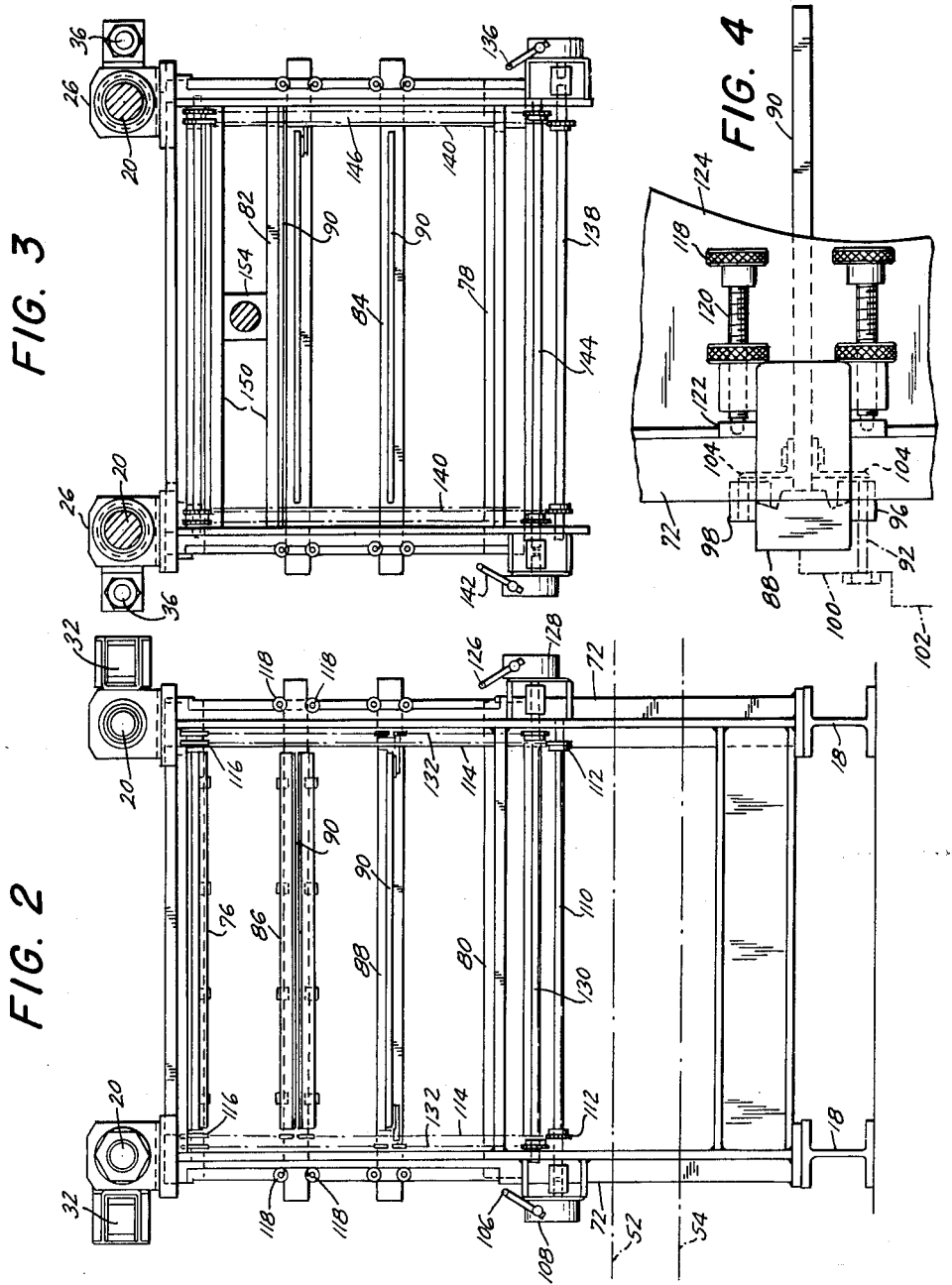

United States Patent Office 3,160,919
Patented Dec. 15, 1964

3,160,919
MOLDING PRESS
Vincent A. Carter, Berkeley Heights, N.J., assignor to Champlain-Zapata Plastic Machinery, Inc., Caldwell, N.J., a corporation of Delaware
Filed June 12, 1962, Ser. No. 201,996
10 Claims. (Cl. 18—17)

This invention relates to molding presses, particularly for the molding of expanded plastic beads.

The general object of the invention is to improve molding presses, and to provide a molding press particularly adapted for the molding of foam plastic articles out of expanded plastic beads. A more particular object is to improve the molding press disclosed in copending applications of William A. Heatley, Jr., Serial No. 149,319, now abandoned, and Paul E. Fischer, Frank H. Lambert, and Wolfram P. P. Spika, Serial No. 149,437, both filed November 1, 1961, and both entitled "Molding Press."

A further object is to provide a molding press which retains the advantages of the molding press disclosed in said copending applications, and which fulfills additional objects and affords additional advantages. Although the said molding press has proved satisfactory in operation, the present press is simpler, less expensive, and more accessible for the connection of the necessary large number of tubes, pipes and wires. In foam molding it is desirable to provide connections for dry air, lubricated air, high pressure steam, low pressure steam, cooling water, and vacuum. There may be additional connections for the control of valves, and for drainage of steam condensate. Moreover, the press is a large one having a large platen area capable of receiving a considerable number of molds, which increases the number of connections needed. Accessibility is therefore very important.

A further object is to afford greater freedom in combining the press with a conveyor belt which receives the ejected molded pieces, as they drop, and moves them out of the machine. Another object is to provide increased access and consequent ease in mounting or changing molds on the platens of the press.

To accomplish the foregoing general objects, and other more specific objects which will hereinafter appear, my invention resides in the molding press elements and their relation one to another as are hereinafter more particularly described in the following specification. The specification is accompanied by drawings in which:

FIG. 1 is a vertical elevation of a molding press embodying features of the invention, the molds and the pipe connections thereto, as well as the motor driven pumps, being omitted to simplify the drawing;

FIG. 2 is an end elevation looking toward the right end of FIG. 1;

FIG. 3 is a vertical section taken approximately in the plane of the stepped line 3—3 of FIG. 1;

FIG. 4 is a fragmentary view, drawn to enlarged scale, and explanatory of the construction of one of the adjustable grid bars;

Figure 5:
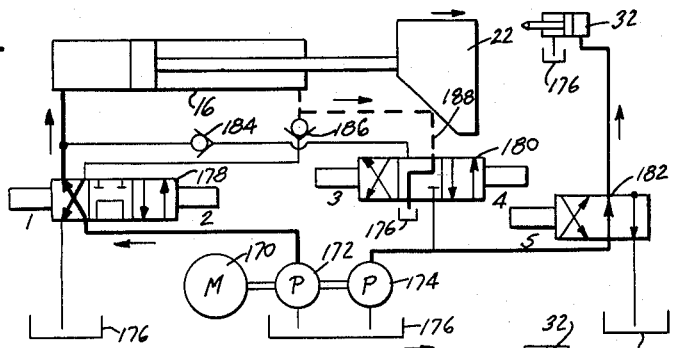
FIG. 5 is a hydraulic diagram showing the flow during closing of the press to a cracked open position.

Referring to the drawing, and more particularly to FIGS. 1, 2 and 3, the molding press comprises a stationary frame including an upright member 12 acting as a stationary platen, and an upright member 14 spaced therefrom and carrying a horizontal double-acting main cylinder 16. There are horizontal girders 18 extending along the floor between the upright members 12 and 14. There are also two horizontally spaced and preferably cylindrical tie rods 20 connecting the upper ends of the upright members 12 and 14.

A movable platen 22 is movable toward or away from the stationary platen 12. There are two forward bearings 24 slidable on tie rods 20 and carrying the movable platen 22. There are two additional rear bearings 26 slidable on the rods 20 and spaced from the bearings 24 in a direction toward the cylinder 16. The slidable bearings 24 and 26 are preferably long and are provided with the usual bushings to take any resulting wear. Appropriate struts, in this case diagonal struts 28, extend between the lower portion of the movable platen 22 and the rear bearings 26 in order to rigidly support the movable platen 22, even though it is carried on only two rods 20 located above the platen.

As an additional measure arising from the suspension of platen 22 wholly beneath the tie rods 20, the cylinder 16 is preferably located with its axis much nearer the top than the bottom of the movable platen. In the present case it is located about one-quarter of the distance down from the top to the bottom of the platen 22, or with reference to the tie rods 20, the cylinder is located about one-third of the distance down between the tie rods and the bottom of the platen 22. This helps offset a possible tendency of the platen to cock or tilt.

In Fig. 1 it will be seen that the piston rod of cylinder 16 is connected to the platen assembly at 30, which is at the rear of the assembly, or generally beneath the rear bearings 26, thus leaving a substantial free space behind the platen 22, which facilitates making the necessary connections to the mold or molds mounted on platen 22.

The side plates with their diagonal struts 28 includes a box assembly made up of horizontal cross bars 150 and a vertical cross bar 152, all welded together to form a rigid box member, which at the middle, receives and is welded to a solid block 154 (Fig. 3) which receives the forward end of the piston rod of the main cylinder 16.

In the present case the platen is 48 inches wide and 36 inches high. The spacing along the slide rods, that is, the spread of the bearings 24 and 26, is forty-two inches.

From the viewpoint of not tending to lift the platen during its closing movement, the main cylinder might be raised to the height of the guide rods. However, there is considerable dead weight, and the main cylinder therefore may be lowered somewhat, which also is more convenient from a design viewpoint, and which helps overcome the inertia of the heavy mass of the movable platen assembly. However, if the main cylinder were lowered too much, it would tend to raise the platen as it moves forward. In deciding the position of the main cylinder the weight of the mold may be omitted. For one thing, this is a variable. For another, the weight when added, is helpful against raising of the platen, that is, the unloaded platen represents the worst case.

When the mold is closed there is a bending force on the guide rods because of a tendency of the movable platen to tilt rearward at the bottom. This is minimized by the wide spread between the large bearings on the guide rod, this spread being forty-two inches. Under maximum possible closing force here provided, say fifty tons, the deflection of the guide rods is only a matter of three thousandths of an inch.

It will be understood that any quantitative dimensions given herein are given solely by way of example, and are not intended to be in limitation of the invention.

In foam molding the mold is cracked open at the beginning of the cycle for a number of reasons. The transfer of beads to the mold cavity may be by suction or Venturi action, and in such case the air stream must be permitted to escape freely from the mold. Later when steam is admitted to help fuse the beads together, escape of the steam and condensate is desirable. The aforesaid copending applications show improved hydraulic stops, whereby the mold initially is closed only to the cracking position, which position may be precisely adjusted, the said stops being retracted when the mold is to be fully closed or "clamped."

When working with expanded plastic beads a large mold closing force may be needed during the molding operation in order to counteract the expansion force of the molded material. This force may be large because of the large parting face area, and yet the mold itself may be of light construction. To prevent possible injury to the mold, the press is provided with positive stop surfaces. In the present case the positive stops are intimately associated with the aforesaid hydraulic stops.

In the present press two hydraulic stops are used, instead of the four heretofore used. Referring to the drawing, there are hydraulic cylinders 32 and plungers 34. These are mounted on the stationary platen 12 and are directed toward the movable platen 22. The movable platen, and more specifically the forward bearings 24, have long adjustable stop screws 36. These may be longitudinally adjusted by means of the nuts 38. The hydraulic plungers 34 are effective against the ends 40 of the stop screws when keeping the mold cracked open, and the plungers are moved back when the mold is clamped closed. The considerable length of the stop screws 36 adapts them for use with molds of widely different size.

In addition, the stationary platen 12 has positive stop surfaces 42 surrounding the plungers 34. The movable platen 22 has positive stop nuts 44 surrounding the ends 40 of the stop screws, and adjustably threaded on the ends of the said stop screws. The adjustment of stop nut 44 may be locked, as by means of a lock nut 46. Thus the position of the stop surfaces 44 may be so located relative to the end 40 of the stop screw that the travel of the movable platen 22 under force of the main cylinder 16 is arrested when the mold has been clamped closed.

When the hydraulic stop plunger 34 is projected it acts on the stop screw surface 40 before the positive stop nut 44 reaches the positive stop surface 42. However, when the hydraulic stops are made ineffective the additional travel is limited by the engagement of the positive stop surfaces and the mold is effectively and tightly closed, but without injuring the mold.

One advantage of the stop nut arrangement shown is that once the desired cracking distance has been established, the stroke may be changed as a unit at the lock nuts 38 to accommodate any change in the dimension of the mold being put into the press. The cracking distance is maintained unchanged. However, when it is desired to change one adjustment independently of the other, that too may be done.

Hydraulic stops 32 and stop screws 36 may be located lower than here indicated, as for example, at the height of the axis of the main cylinder 16, but it is more convenient to mount them high as here shown, so that they are entirely out of the way, and also because the bearings on which they are mounted afford a sturdy and rigid mounting.

The molding press is combined with a conveyor 50 for removing the molded articles. This conveyor is preferably an endless mesh belt having an upper pass 52 and a lower pass 54, the belt being carried on end rollers which are turned in unison by appropriate chains 56 carried on sprocket wheels, at least some of the latter being driven by a motor 58 through a belt 60, reduction gearing 62, and a further drive housed at 63. The edges of the mesh belt are secured to and supported by the chains. The frame 64 of the conveyor is carried on legs 66, preferably fitted with wheels 68, so that the conveyor may be rolled out of the way when mounting or changing molds. With the conveyor out of the way, an operator may stand between the platens, and has a clear space in which to work, there being no lower tie rods, and the upper tie rods 20 being above his head. The conveyor 50 is located at a height below the bottom of the movable platen 22 so that there is no interference with opening and closing of the mold. Because of the absence of lower tie rods there is no interference with gravitational drop of large molded articles on to the conveyor, nor with horizontal delivery of such articles by the conveyor.

The parts 12 and 22 have been referred to as platens. However, these are of the open frame or grid type, rather than a flat continuous plate. The platens comprise vertical ways 70 and 72 at their side edges, with horizontal grid bars extending between the ways. The top grid bars 74 and 76, and the bottom grid bars 78 and 80 are fixed to the ways, but the intermediate grid bars 82, 84, 86 and 88 are adjustably movable up and down on the ways, as by means of crank and sprocket chain mechanism.

Each grid bar comprises a forward portion backed by a wide horizontal stiffening portion 90. The mold is received between two grid bars, and is secured thereto by bolts, one of which is indicated at 92 in FIG. 4. Bolt 92 is received in a nut 96 which is slidable along the back of grid bar 88 at its bottom edge. There are a number of such nuts for use with as many bolts as may be needed. Similar nuts 98 are provided for use along the upper edge of the grid bar. The bolt 92 passes through a flange 100 of mold 102, and then outside the grid bar, and into the nut 96. With this arrangement each bolt may be located at any desired point along the grid bar. Back plates 104 may be provided to retain the nuts against separation from the grid bar. The tapered relation between the overlapping parts of the nuts and the grid bar, together with back plate 104, retains the nuts against separation from the grid bar, which is helpful in holding the nuts in position.

The top fixed grid bars 74 and 76 have nuts along only the bottom edge. The bottom fixed grid bars 78 and 80 have nuts along only their top edge. The grid bars 82, 84, 86 and 88 are movable, and these have nuts along both the top and bottom edge.

The vertical adjustment of the movable grid bars is preferably facilitated by appropriate crank and sprocket chain mechanism. Referring to FIGS. 1 and 2, the crank 106 drives worm reduction gearing housed in gear box 108 and terminating in a shaft 110. This carries sprocket wheels 112 (FIG. 2) which drive sprocket chains 114, the latter being carried at their upper end on sprocket wheels 116. The upper grid bar 86 is connected to one pass of the sprocket chains, and rotation of crank 106 raises or lowers the grid bar 86. The use of worm gearing for adjustment of the grid bars has the advantage of being irreversible, so that the bars remain in adjusted position unless intentionally moved.

When the grid bar has been moved to desired position, it may be clamped securely in that position by tightening four clamp knobs 118 at the ends of the grid bar. These are drawn to larger scale in FIG. 4, in which each knob 118 turns a screw 120 bearing against a shoe 122 riding on the rear of the upright way 72. The forward element 88 of the grid bar rides in front of the ways 72, while the stiffening web 90 is somewhat shorter and is located between the upright ways 72 and their stiffening webs shown at 124. The screws 120 pass through a rearwardly projecting block secured at each end of grid bar 88, and when the screws are tightened the shoe 122 is forced against the way 72, thus locking the grid bar in position.

Reverting to FIGS. 1 and 2, it will be understood that the crank 126 drives worm reduction gearing in gear box 128 to turn an upper shaft 130 which carries sprocket wheels for another pair of sprocket chains 132. The upper ends of the chains are supported on idle sprocket wheels carried on the same shaft as the sprocket wheels 116. The chains 132 are connected to the lower grid bar 88.

This bar similarly has clamp knobs at its ends to lock the grid bar in adjusted position.

Referring next to FIGS. 1 and 3, the movable grid bars 82 and 84 are similarly adjusted by worm gear and sprocket chain mechanism, there being a handle 136 for shaft 138, chains 140, and upper grid bar 82. There is also a crank 142 for shaft 144, chains 146, and lower grid bar 84. Here again the ends of the grid bars are provided with clamp knobs to lock the bars in adjusted position. It will be understood that in the case of the movable platen 22, the adjusting mechanism is carried by the platen assembly and moves with it.

The hydraulic operation may be described with reference to FIGS. 5, 6 and 7 of the drawing. Referring to FIG. 5, a motor 170 drives both a low pressure pump 172 and a high pressure pump 174. There is a common sump or tank, indicated in three parts at 176. The main cylinder is shown at 16 for moving the movable platen 22, while the hydraulic stops are shown at 32. The system is controlled by three valves, indicated at 178, 180 and 182. In practice these are solenoid operated, and the solenoids are marked 1 through 5 respectively. Check valves may be provided at 184 and 186.

FIG. 5 shows the closing of the press, and it will be seen that the low pressure fluid from pump 172 flows through valve 178 to the outer end of the main cylinder, thereby moving the platen 22 to the right. Oil from the inner end of the main cylinder flows through the valve 180 to the tank 176, as shown by the broken line 188. Pressure fluid from the high pressure pump 174 flows through valve 182 to the hydraulic stops. The press is rapidly and economically closed by the large volume low pressure fluid. In the particular case here shown, the main cylinder at this time exerts a force of eight tons, and the hydraulic stops exert a force of six tons each, or twelve tons in all.

Figure 6:
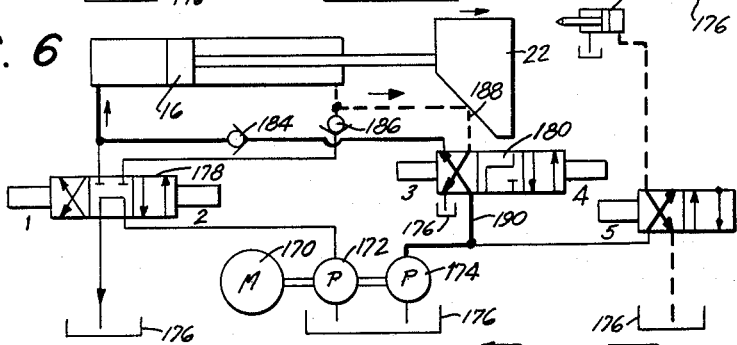
FIG. 6 is a similar diagram showing the flow during clamping or complete closing of the mold.

After the filling and preliminary steaming of the mold cavity, it may be completely closed by appropriate operation of the valves, shown in FIG. 6 of the drawing. At this time the hydraulic stops are released as shown by the discharge of fluid through the valve 182 to tank 176. The main cylinder is now fed with high pressure fluid from pump 174, this fluid flowing through line 190, valve 180, and check valve 184 to the main cylinder 16. Return flow through line 188 is maintained and leads to tank 176. The low pressure pump 172 is idle and its liquid circulates back to the tank 176 through valve 178.

When supplied with high pressure fluid, the main cylinder in the illustrated press develops a force of fifty tons. This is needed because of the large area of the press platen, which is three feet high by four feet wide, and which may accept a correspondingly large mold having a large cavity area at the parting face. Under maximum area conditions the fifty ton force is needed, and yet because of the size and complexity of the molds used for foam molding, which preferably have thin walls because they must be repeatedly heated and cooled in rapid alternation in successive molding cycles, the mold may be injured by the fifty ton closing force when there is no counter-force developed by bead expansion in the mold cavity itself. It is for that reason that the positive stops are desirable.

Figure 7:
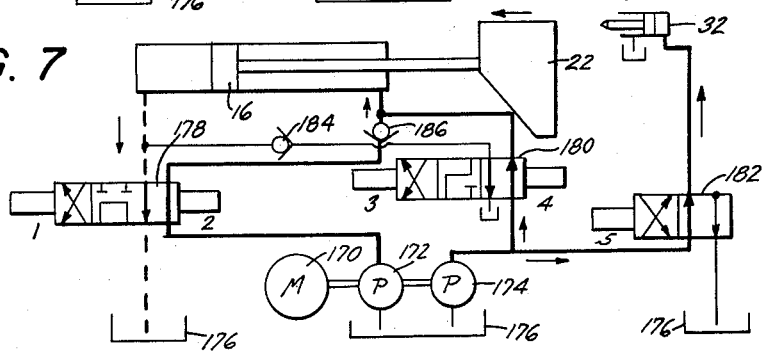
FIG. 7 is a similar diagram showing the flow during opening of the press.

The opening of the press is shown in FIG. 7. It usually requires an extra great force to initially break the mold open. Accordingly, high pressure fluid is fed from pump 174 through valve 180 to the inner end of the main cylinder 16. The action is aided by the hydraulic stops, and for this purpose high pressure fluid is fed to them through valve 182. In addition, low pressure fluid is fed from pump 172 through valve 178 to the inner end of the main cylinder 16. This causes rapid and more economical opening of the press. The fluid from the outer end of cylinder 16 is discharged through valve 178 to tank 176.

With the particular solenoid operated valves here shown, solenoid 1 is energized during closing of the mold. Solenoid 1 is de-energized and solenoids 3 and 5 are energized during the clamping of the mold for the molding operation. These solenoids are de-energized and solenoid 4 is energized during opening of the mold.

Limit switches and interlocking switches and a timing clock may be employed for any desired degree of automatic operation of the press, but for purposes of the present invention, it may be assumed that the switches are manually operated to control the solenoid valves.

It is believed that the construction and operation of the improved molding press, as well as the advantages thereof, will be apparent from the foregoing detailed description. It will also be apparent that while I have shown and described the invention in a preferred form, changes may be made in the structure shown without departing from the scope of the invention, as sought to be defined in the following claims.

In the claims the reference to mounting of hydraulic stops on the stationary platen and stop screws on the moving platen is not intended to exclude the reverse arrangement in which the hydraulic stops are carried by the movable platen and the stop screws by the stationary platen. However, the illustrated arrangement has the advantage that the piping to the hydraulic stops may be stationary instead of movable.

I claim:
1. A molding press for the molding of expandable plastic beads comprising
   (a) a stationary frame including
      (1) a first upright member having a portion defining a stationary platen adapted to have a first mold section mounted thereon,
      (2) a second upright frame member spaced from said first upright frame member, and
      (3) means connecting said upright members at the upper end portions thereof comprising a pair of laterally spaced, horizontal tie rods,
   (b) a movable platen adapted to have a second mold section mounted thereon and being slidably suspended only from said tie rods at two longitudinally spaced points thereon for movement toward and away from said stationary platen, the area between said platens being unobstructed and freely accessible in all positions thereof, and
   (c) hydraulically operable means carried by said second upright member and connected to said movable platen at a point within the upper half thereof for moving said movable platen toward and away from said stationary platen.

2. The structure set forth in claim 1 wherein said movable platen has a pair of forward bearings and a pair of rearward bearings slidably mounted on said tie rods and suspending said movable platen therefrom, said forward and rearward bearings being spaced longitudinally on said tie rods a sufficient distance to minimize bending loads on said movable platen when in said third position.

3. The structure set forth in claim 2 wherein said movable platen has diagonal struts between the lower portion thereof and the rearward bearings to rigidly support the movable platen although carried on only said two tie rods located thereabove.

4. A molding press for the molding of expandable plastic beads comprising
   (a) a stationary frame including
      (1) a first upright member having a portion defining a stationary platen adapted to have a first mold section mounted thereon,
      (2) a second upright member spaced from said first upright member, and
      (3) means connecting said upright members only at the upper and lower end portions thereof comprising a pair of laterally spaced, horizontal tie rods extending between said upright members at the upper ends thereof and horizontal members extending therebetween at the lower ends thereof, (b) a movable platen having a substantially vertical forward face adapted to have a second mold section mounted thereon and also having a pair of forward bearings carried by the upper end of said forward face and slidably mounted on said tie rods, a pair of rearward bearings slidably mounted on said tie rods and spaced longitudinally thereof from said forward bearings, and diagonal struts extending between the lower end of said forward face and said rearward bearing to rigidly support said platen from said tie rods and to minimize the bending loads thereon, said movable platen being thereby slidably suspended from said tie rods above said horizontal members for movement toward and away from said stationary platen between a first open position, a second position spaced toward said stationary platen from said first open position, and a third clamped position, and (c) a main hydraulically operable cylinder carried by said second upright member and connected to said movable platen at a point within the upper half thereof for moving said movable platen between said first, second and third positions.

5. The structure set forth in claim 4 including (d) stop means carried by the upper end portions of said first upright member and said movable platen for momentarily stopping said movable platen in said second position and for aiding said main cylinder in moving said movable platen from said third, clamped position toward said first, open position, said stop means comprising hydraulic stops including cylinders and plungers, and adjustable stop screws engageable with said plungers when said movable platen is moved to said second position.

6. The structure set forth in claim 4 including (d) adjustable positive stop means carried by said first upright member and said movable platen for stopping said movable platen in said third position to protect mold sections carried by said platens from damage due to the clamping force exerted by said main cylinder.

7. The structure set forth in claim 4 including (d) a driven conveyor means mounted beneath said stationary platen and said third position of said movable platen for receipt of molded articles from mold sections carried by said platens for moving such articles away from said platens.

8. A molding press for the molding of expandable plastic beads comprising (a) a stationary frame including
 (1) a first upright member having a portion defining a stationary platen adapted to have a first mold section mounted thereon,
 (2) a second upright member spaced from said first upright member, and
 (3) means connecting said upright members only at the upper and lower end portions thereof comprising a pair of laterally spaced, horizontal tie rods extending between said upright members at the upper ends thereof and horizontal members extending therebetween at the lower ends thereof, (b) a movable platen having a substantially vertical forward face adapted to have a second mold section mounted thereon, and also having a pair of forward bearings carried by the upper end of said forward face and slidably mounted on said tie rods, a pair of rearward bearings slidably mounted on said tie rods and spaced longitudinally thereof from said forward bearings, and diagonal struts extending between the lower end of said forward face and said rearward bearing to rigidly support said movable platen from said tie rods and to minimize the bending loads thereon, said movable platen being thereby slidably suspended from said tie rods above said horizontal members for movement toward and away from said stationary platen between a first, open position, a second position spaced toward said stationary platen from said first, open position, and a third, clamped position, (c) a main hydraulically operable double acting cylinder carried by said second upright member and connected to said movable platen at a point within the upper half thereof for moving said movable platen between said first, second and third positions, (d) adjustable positive first stop means carried by said first upright member and said movable platen for stopping said movable platen in said third position to protect mold sections carried by said platens from damage due to the clamping force exerted by said main cylinder, (e) second stop means carried by the upper end portions of said first upright member and said movable platen and comprising hydraulic stops including cylinders and plungers, and adjustable stop screws engageable with said plungers when said movable platen is moved to said second position, and (f) means connected to said main cylinder and said hydraulic stops for delivering hydraulic fluid to said main cylinder to move said movable platen from said first position toward said third position, for delivering hydraulic fluid to said hydraulic stops to momentarily interrupt the movement of said movable platen at said second position, for terminating the delivery of hydraulic fluid to said hydraulic stops while continuing the delivery of hydraulic fluid to said main cylinder to move said movable platen from said second position to said third position, and for delivering hydraulic fluid to the main cylinder to move said movable platen from said third position toward said first position and simultaneously delivering hydraulic fluid to said hydraulic stops to aid said main cylinder in the initial movement of the movable platen from the third, clamped position.

9. The structure set forth in claim 8 wherein each of said platens comprises vertical ways, horizontal grid bars extending between and carried by said ways, at least some of said grid bars being vertically adjustable on said ways, means interconnecting said adjustable grid bars for common vertical adjustment thereof, and clamp means for locking said adjustable grid bars in adjusted position.

10. A molding press for the molding of expandable plastic beads comprising (a) a stationary frame including
 (1) a first upright member having a portion defining a stationary platen comprising vertical ways and horizontal grid bars extending between and carried by said vertical ways, at least some of said grid bars being vertically adjustable relative to said ways, means for vertical adjusting said adjustable grid bars and clamp means for clamping said grid bars in adjustable position,
 (2) a second upright member spaced from the first upright member, and
 (3) means connecting said upright members only at the upper and lower ends thereof comprising a pair of laterally spaced horizontal cylindrical tie rods extending between said upright members at the upper ends thereof and horizontal girder members extending therebetween at the lower ends thereof, (b) a movable platen having a substantially vertical forward face comprising vertical ways, horizontal grid bars extending between and carried by said vertical ways, at least some of said grid bars being vertically adjustable relative to said ways, means for vertically adjusting said adjustable horizontal grid bars and clamp means for clamping said adjustable grid bars in an adjusted position, said movable platen also having a pair of forward bearings carried by the upper end of said forward face and slidably mounted on said tie rods, a pair of rearward bearings slidably mounted on said tie rods and spaced longitudinally thereof from said forward bearings on the opposite side of said forward bearings from said first upright member, and diagonal struts extending between the lower end of said forward face and said rearward bearings to rigidly support said movable platen from said tie rods in a manner to minimize the bending loads thereon, said movable platen being thereby slidably suspended from said tie rods above said horizontal members for movement toward and away from said stationary platen between a first open position, a second position spaced toward said stationary platen from said first position, and a third clamped position, (c) a main hydraulic double acting cylinder carried by said second upright member and connected to said movable platen within the upper half thereof downwardly from said tie rods a distance of about one-third of the vertical dimension of said movable platen, said cylinder moving said movable platen between said first, second and third positions, (d) adjustable positive first stop means carried by said first upright member and said movable platen for stopping said movable platen in said third position to protect mold sections carried by said platens from damage due to the clamping force exerted by said main cylinder, (e) second stop means carried by the upper end portions of said first upright member and said movable platen and comprising hydraulic stops including cylinders and plungers, and adjustable stop screws engageable with said plungers when said movable platen is moved to said second position, (f) means connected to said main cylinder and said hydraulic stops for delivering hydraulic fluid to said main cylinder to move said movable platen from said first position toward said third position, for delivering hydraulic fluid to said hydraulic stops to momentarily interrupt this movement of said movable platen at said second position, for then terminating the delivery of hydraulic fluid to said hydraulic stops while continuing the delivery of hydraulic fluid to said main cylinder to move said movable platen from said second position to said third position, and for delivering hydraulic fluid to the main cylinder to move said movable platen from the third position towards said first position and simultaneously delivering hydraulic fluid to said hydraulic stops to aid said main cylinder in the initial movement of said movable platen from the third position toward said first position, and (g) conveyor means mounted beneath said stationary platen and said third position of said movable platen for receipt of molded articles from mold sections carried by said platen for moving such articles away from said platens.

References Cited in the file of this patent

UNITED STATES PATENTS

| | | |
|---|---|---|
| 2,351,529 | Luxenberger et al. | June 13, 1944 |
| 2,549,758 | Cotner | Apr. 24, 1951 |
| 2,642,621 | Amo | June 23, 1953 |
| 2,718,662 | Bohannon et al. | Sept. 27, 1955 |
| 2,755,505 | Bishop | July 24, 1956 |
| 2,926,412 | Stacy et al. | Mar. 1, 1960 |
| 2,938,232 | Martin | May 31, 1960 |
| 3,044,119 | Poulin | July 17, 1962 |

OTHER REFERENCES

Russia, 128,598, Bulletin of Inv. No. 10 of 1960.